United States Patent [19]
Tabuchi et al.

[11] Patent Number: 5,905,995
[45] Date of Patent: May 18, 1999

[54] DISK ARRAY SUBSYSTEM WITH SELF-REALLOCATION OF LOGICAL VOLUMES FOR REDUCTION OF I/O PROCESSING LOADS

[75] Inventors: Hideo Tabuchi; Hisashi Takamatsu; Akinobu Shimada, all of Odawara, Japan

[73] Assignee: Hitachi, Ltd., Tokyo, Japan

[21] Appl. No.: 08/698,864

[22] Filed: Aug. 16, 1996

[30] Foreign Application Priority Data

Aug. 31, 1995 [JP] Japan ................................. 7-223029

[51] Int. Cl.⁶ .................................................. G06F 12/00
[52] U.S. Cl. ...................................... 711/114; 395/182.05
[58] Field of Search ........................ 711/114; 395/182.05, 395/182.07

[56] References Cited

U.S. PATENT DOCUMENTS 5,369,758  11/1994  Larson et al. .................. 395/182.05
5,546,535  8/1996  Stallmo et al. .................. 395/182.07

FOREIGN PATENT DOCUMENTS 6-161837  6/1994  Japan ........................... G06F 12/00

*Primary Examiner*—Glenn A. Auve
*Attorney, Agent, or Firm*—Antonelli, Terry, Stout & Kraus, LLP

[57] ABSTRACT

A disk array subsystem includes a logical volume allocation controller, which divides and reallocates data of the same logical volume LVN among a plurality of magnetic disk drive groups when a magnetic disk group is added thereto. Successful logical-volume allocation can reduce the I/O processing frequency between magnetic disk drive groups, thus achieving enhanced performance of the disk array subsystem.

8 Claims, 2 Drawing Sheets

DISK ARRAY SUBSYSTEM WITH SELF-REALLOCATION OF LOGICAL VOLUMES FOR REDUCTION OF I/O PROCESSING LOADS

BACKGROUND OF THE INVENTION

1. Field of the Invention

The present invention relates generally to a disk array subsystems adaptable for use as storage device in a computer system, and more particularly to a disk array subsystem for automatically performing self-reallocation of logical volumes without requiring any assistance by its associated host computer such as a host computer operatively connected thereto.

2. Description of the Prior Art

Conventionally, a magnetic disk subsystem carries important tasks in that it plays a significant role of the external storage device for a computer system. Especially, a disk array subsystem has become more important for applications as advanced magnetic disk subsystem with high reliability.

In general, the disk array subsystems are known as redundant array of inexpensive disks (RAIDs), which may be classified in five categories of different levels of from RAID1 to RAID5 based on the characteristics thereof. At present, of these five (5) levels, special attention is taken to the RAID5 architecture that may attain high reliability and wide applicability at lower cost and is thus expected to be adapted for use in the transaction processing essentially consisting of several small-capacity random access procedures. Typically, one prior known disk array subsystem includes a magnetic disk drive device for record and/or reproduction of data, a magnetic disk control device that controls the data transmission between the magnetic disk drive device and a host computer.

The magnetic disk drive device has therein a magnetic disk drive for recording data. The RAID5 architecture is designed to employ a specific format allowing a plurality of magnetic disk drives to be operatively combined into one group, which is then assumed to exhibit more than one logically defined volume (referred to as "logical volume" hereinafter).

In such disk array subsystem any enhancement of subsystem's capacity may be attained by additional installation of a magnetic disk drive(s) thus either providing a further logical volume or causing the logical volume to increase in capacity as a whole. However, in the situation where input/output (I/O) processing tasks tend to be concentrated on a specific logical volume, the I/O processings are to be locally directed or "focussed" onto a magnetic disk drive group being allocated with the said logical volume, resulting in an increase in the processing wait time of magnetic disk drives due to the occurrence of contention or conflict of the identical processings. This will possibly prevent the disk array subsystem from taking full advantage of it in performance.

Published Unexamined Japanese Patent Application (PUJPA) No. 6-161837 discloses therein an arrangement for choosing a volume selection scheme from among a group of volume selection schemes thus enabling them to be selectively utilized automatically as necessary. Due to the possibility of changing or modifying the optimal volume selection scheme, it is possible to accomplish effective file allocation for reduction of the concentration of I/O loads upon a specific volume.

As the information-oriented society is highly advanced, the amount of data it possesses is increasing more and more. Accordingly, the magnetic disk drives are strongly demanded to attain a further increase both in mass storage and in reliability. To meet such demand, a disk array subsystem that offers higher reliability is utilized; on the contrary, for the need to enhance the storage capacity, it has been one typical approach in the prior art to employ a mere method of simply adding magnetic drives while having to additionally install corresponding ones of logical volumes therefor or having to extend the logical volume in capacity.

Additionally, as the storage capacity increases, the concentration of I/O processings for a specific file will take place more frequently than ever. To avoid this problem, the prior art system attempts to use automated volume selection techniques achieving an effective allocation of files concerned.

Unfortunately, such prior art disk array subsystem is encountered with a problem as follows. When the logical volume per se is added, it is difficult when using the prior known file allocation method to avoid the concentration of I/O processings upon the same magnetic disk drive in the situation where the processing tasks are to be concentrated on a specific volume; it will be readily seen that the above difficulty results in the processing wait time being undesirably increased due to the occurrence of contention or conflict in a queue of several I/O processings, which may adversely serve to make it impossible to take full advantage of the subsystem's inherent performance.

SUMMARY OF THE INVENTION

It is therefore an object of the present invention to provide a new and improved disk array subsystem capable of avoiding the problems faced with the prior art.

It is another object of the invention to provide an improved disk array subsystem capable of suppressing concentration of I/O processing on a certain magnetic disk drive group during additive installation of one or more magnetic disk drives.

It is a further object of the invention to provide an improved disk array subsystem capable of suppressing or eliminating concentration of I/O processing tasks with respect to a certain magnetic disk drive group when one or more additional magnetic disk drives are installed to attain further enhanced mass storage as needed, thereby enhancing the performance of a magnetic disk array subsystem as a whole.

To achieve the foregoing objects, the present invention provides a disk array subsystem which includes a specific disk control device. This control device is specifically arranged in such a manner that, when a logical volume is added as a result of installation of an additional magnetic disk drive group(s) therein, the disk control device receives logical information involving the file attribute, the total volume number, the correspondence between the logical volumes and/or the magnetic disk drives, and then independently performs—without the need of cooperation with its an host computer—any required modifications of the locations of logical volumes and movement of data there between so as to suppress any possible concentration of I/O processings with respect to the same magnetic disk drive group, by, for example, (i) dividing the storage capacity area of each magnetic disk drive into portions corresponding to the total logical volume number within the subsystem, (ii) numbering respective ones of the divided area portions of each magnetic disk drive, and (iii) causing the number of each area portion to be identical to that of the logical volume under predefined conditions. Very importantly, these processings remain attainable in a parallel manner with execution of ordinary processings on the real-time basis.

A significant advantage of the present invention is that it is possible to suppress contention or conflict otherwise occurring due to concentration of I/O processings on a magnetic disk drive group being allocated with a certain logical volume to which concentration of processing is to be applied, thus enabling the difference in I/O processing frequency to decrease between respective magnetic disk drive groups.

Another advantage of the invention is that the processing wait time of magnetic disk drives can be reduced accomplishing enhanced performance of the disk array subsystem.

A further advantage of the invention is that since the reallocation of logical volumes is carried out in a parallel fashion with execution of ordinary processings of the host computer and the disk array subsystem, it becomes possible to allow the ordinary processing procedures to continue without any interruptions.

These and other objects, features and advantage of the invention will be apparent from the following more particular description of preferred embodiments of the invention, as illustrated in the accompanying drawings.

DETAILED DESCRIPTION OF THE INVENTION

Figure 1:
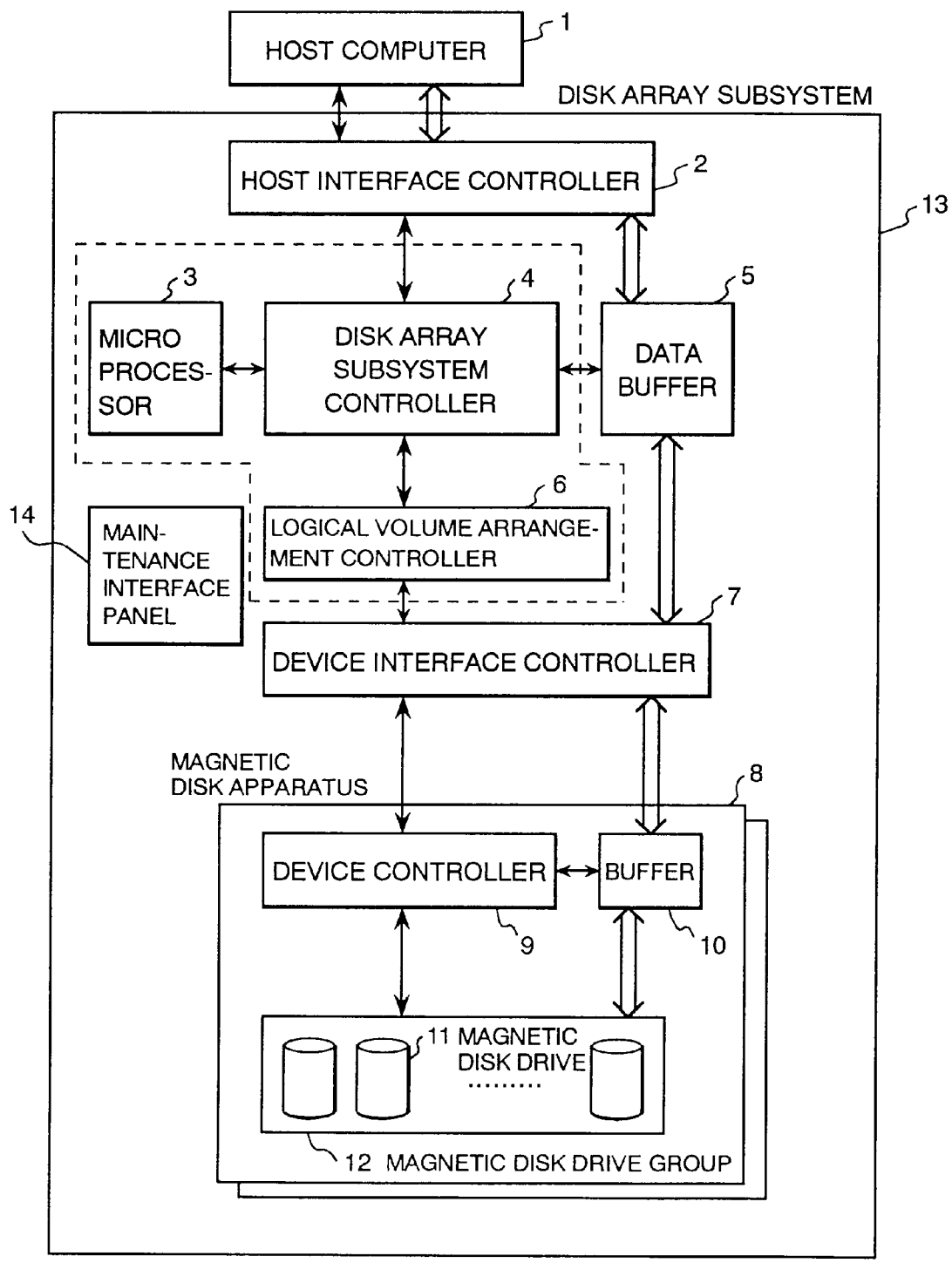
FIG. 1 is a block diagram of a system configuration of a disk array subsystem in accordance with one preferred embodiment of the invention.

Referring to FIG. 1, a disk array subsystem in accordance with one preferred embodiment of the invention is generally designated by the numeral 13. Single-line arrows are used in FIG. 1 to designate a control signal transmission path, whereas double-line arrows are to indicate a data transfer path.

The disk array subsystem 13 has a magnetic disk control section connected to a host computer 1, and a magnetic disk device 8 connected under the control thereof, thereby constituting the disk array subsystem 13 which follows the principles in the RAID5 architecture. The magnetic disk control section has a host interface controller 2 for performing transmission of information to or from the host computer 1, a data buffer 5 for temporarily storing data therein, a microprocessor 3 for providing overall control of the subsystem 13, a disk array subsystem controller 4 for performing issuance and/or receipt of commands based on the instructions from the microprocessor 3, a logical volume allocation controller 6 for executing control of the allocation of logical volumes, and a device interface controller 7 for effecting transmission of information to or form the magnetic disk device 8. The magnetic disk control device controls overall data transmission between the magnetic disk drives 11 and the host computer 1. The microprocessor 3 may include therein a control memory (not shown) that stores control information to be used when the microprocessor 3 performs several kinds of control operations.

In actual applications, depending upon the performance, scale or other parameters of LSIs used, it may be possible to incorporate into a single LSI chip certain parts or components of the disk array subsystem, which may include the microprocessor 3, the disk array subsystem controller 4, and the logical volume allocation controller 6—further including the host interface controller 2, data buffer 5 and device interface controller 7, as needed—as indicated by a broken line in FIG. 1.

The disk subsystem 13 also includes an interface panel for maintenance use, which will be utilized when users or service persons exchange one or more magnetic disk drives 11 or further install add-in drives therein.

The magnetic disk device 8 has a magnetic disk drive group 12, a device controller 9 for controlling them, and a data buffer 10. The magnetic disk drive group 12 includes a plurality of magnetic disk drives 11, wherein data may be subdivided into a plurality of blocks to be stored in the magnetic disk drives 11 sequentially. These magnetic disk drive group 12 is logically treated by the host computer 1 as one volume.

It may be considered that enhancement of the disk subsystem's storage capacity is attained by means of increment of the volume number. To do this, it will be required that an additional magnetic disk drive group 12 be newly installed therein while causing the host computer 1 to execute definitions of new volume attributes. Note here that it will possibly happen that the copendency of a newly defined volume(s) and prior defined volumes may render their I/O processings different in frequency from each other. Due to this, the logical volume allocation controller 6 has a specific function that enables the disk array subsystem 13 per se to automatically perform—without requiring any cooperation with the host computer 1—modifications of the location of logical volume being previously set by host computer 1 in the magnetic disk drive group 12 and movement of data therebetween, as needed when the magnetic disk drives 11 are subject to such additional installation.

Such a series of operations of logical volume location modification and data movement are performed by the disk array subsystem 13 independently of other operations after recognition of the newly set volume at the host computer 1; alternatively, the operations may be accomplished by providing instructions of operation content to the logical volume allocation controller 6 through the maintenance interface panel 14. Conversely, disablement of the logical volume location modifying and data moving operations can also be performed by way of the maintenance-use interface panel 14. It should be noted that these processings are executed without any interruptions of ordinary processings between the host computer 1 and the disk array subsystem 13.

The processing operation of the disk array subsystem shown in FIG. 1 is as follows. See FIG. 2, which diagrammatically represents one example of the logical volume reallocation processing accompanying the additive volume installation.

As shown, at a processing step P1, a logical volume number LVN1 is assigned while the magnetic disk drive group consisting of a plurality of magnetic disk drives is logically regarded as a single volume 15.

Assume that a new logical volume is to be added due to installation of additional disk drives to attain enhancement of the storage capacity. In this case, as shown at a process step P2, a new magnetic disk drive group is additionally installed while allowing the host computer 1 to assign to this disk drive group a volume 16 having a logical volume number LVN2. Accordingly, with such settings, logical volumes with different volume numbers LVN1, LVN2 may coexist relative to magnetic disk drive groups 15, 16 after the additional installation of the logical volume 16.

Figure 2:
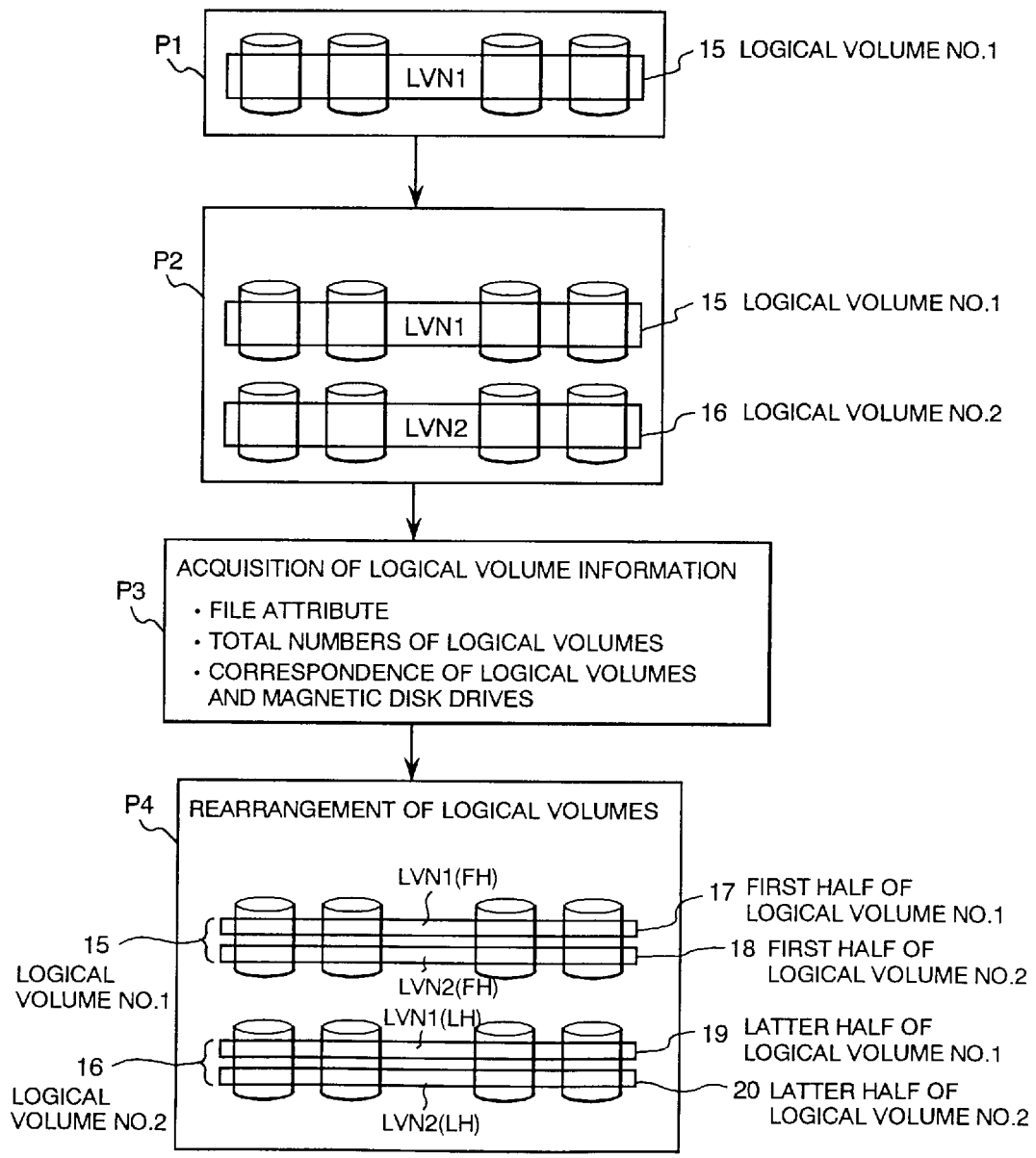
FIG. 2 is a flow diagram showing the major steps in the logical volume reallocation execution operation of the disk array subsystem shown in FIG. 1.

Then, as shown at a process step P3, the logical volume allocation controller 6 receives logical volume information such as the file attributes, the total logical volume number, the correspondence between the logical volumes and magnetic disk drives, and the like. Subsequently, at a process step P4, the logic volume allocation controller 6 performs—based on this logical volume information—allocation of logical volumes as previously assigned by the host computer 1 with respect to the magnetic disk drive groups on the part of the disk array subsystem. At this step, movement of data is also performed. The logical volume location modification and data movement at this proces step P4 are carried out in such a way as to suppress the occurrence of any possible deviations of I/O processings between respective magnetic disk drives based on the aforesaid logical volume information; for instance, as one typical example, the operations are effected so as to link or "bridge" between the areas of respective magnetic disk drive groups each constituting the logical volume being previously assigned by host computer 1, as shown in FIG. 2.

More specifically, the logical volume 15 with the logical volume number LVN1 at the process step P2 is subdivided into a first half and a second or latter half portion, for example. As shown at the process step P4, it is divided into a first-half logical volume 17 with a logical volume number LVN1(FH) and a latter-half logical volume 19 with a logical volume number LVN1(LH), which are then allocated in the magnetic disk drive groups 15, 16, respectively.

Likewise, the logical volume 16 with the logical volume number LVN2 at the process step P2 is subdivided at the process step P4 into a first-half logical volume 18 with a logical volume number LVN2(FH) and a latter-half logical volume 20 with a logical volume number LVN1(LH), which are reallocated in the magnetic disk drive groups 15, 16, respectively. Thereafter, movement of data accompanying this reallocation is carried out automatically. The location modifying processing and the data movement processing are performed without necessitating any interruptions of ordinary processings being carried out between the host computer 1 and the disk array subsystem.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A disk array subsystem comprising:
a magnetic disk drive group including a plurality of magnetic disk drives; and
a disk control device for control of data transfer between said disk drive group and a host computer,
wherein allocation of a logical volume set on said magnetic disk drive group is modified so as to reduce variation in frequency of input/output processing tasks among said plurality of magnetic disk drives.

2. The disk array subsystem according to claim 1, wherein the modification of said volume allocation and the movement of data are executed on the basis of logical volume information according to a setting change in the magnetic disk drive.

3. The disk array subsystem according to claim 2, wherein during modification of said volume location and movement of data, rearranging preset locations of logical volumes and movement of data is carried out while allowing the remaining processing to continue between the host computer and the disk array subsystem.

4. The disk array subsystem according to claim 1, wherein during modification of said volume location and movement of data, rearranging preset locations of logical volumes and movement of data is carried out while allowing the remaining processing to continue between the host computer and the disk array subsystem.

5. A disk array subsystem comprising:
a magnetic disk drive group including a plurality of magnetic disk drives;
a disk control device for control of data transfer between said disk drive group and an upper-level device operatively coupled thereto; and
means for rearranging preset locations of logical volumes on part of said disk array subsystem based on logical volume information consistent with a change in location of the magnetic disk drives by dividing storage regions of each said magnetic disk drive into portions being identical in number to said logical volumes within said subsystem and by a allowing data to move so that data of different logic volumes are stored in the divided portions of said storage regions of each said magnetic disk drive.

6. The disk array subsystem according to claim 5, wherein rearranging preset locations of logical volumes by dividing storage regions of magnetic disk drive and the movement of data are attained such that a logical volume is allocated to eliminate concentration of input/output (I/O) processing tasks on a specific magnetic disk drive and contention of I/O processing tasks therein.

7. The disk array subsystem according to claim 5, wherein during rearranging preset locations of logical volumes by dividing storage regions of magnetic disk drive and movement of data, rearranging preset locations of logical volumes and movement of data is carried out while allowing the remaining processing to continue between the supervisory device and the disk array subsystem.

8. The disk array subsystem according to claim 1 or 5, wherein rearranging preset locations of logical volumes by dividing storage regions of magnetic disk drive and movement of data are carried out upon occurrence of additional installation of a magnetic disk drive and a logical volume.

* * * * *